United States Patent Office 3,217,008
Patented Nov. 9, 1965

3,217,008
4 - ALKOXYCARBONYL - 1 - AMINO - 4 - PHENYL-PIPERIDINES, DERIVATIVES THEREOF AND INTERMEDIATES THERETO
Max J. Kalm, Wilmette, and Calvin H. Lovell, Morton Grove, Ill., assignors to G. D. Searle & Co., Chicago, Ill., a corporation of Delaware
No Drawing. Filed Jan. 22, 1962, Ser. No. 167,948
14 Claims. (Cl. 260—294)

The present invention is concerned with novel substituted 1-aminopiperidines and, more particularly, with 4-alkoxycarbonyl-1-amino-4-phenylpiperidines and derivatives thereof, which are represented by the formula

wherein X is hydrogen or chlorine, Z is a hydroxy, hydroxymethyl, carboxy, or (lower alkoxy)carbonyl radical, and R can be hydrogen or a lower alkyl, phenyl(lower alkylene), or cycloalkyl radical of the formula

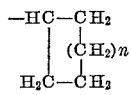

$n$ being a positive integer less than 5.

The lower alkyl radicals comprehended by the R term are exemplified by methyl, ethyl, propyl, butyl, pentyl, hexyl, and the branched-chain isomers thereof. Typically, the lower alkoxy radicals represented in the Z term can be methoxy, ethoxy, propoxy, butoxy, pentyloxy, hexyloxy, and the branched-chain groups isomeric therewith. Specific examples of lower alkylene radicals represented by R are methylene, ethylene, trimethylene, tetramethylene, pentamethylene, and the isomeric branched-chain radicals.

Starting materials suitable for the manufacture of the instant compounds are the substituted piperidines of the formula

wherein X is hydrogen or chlorine and Y is a (lower alkoxy)carbonyl or hydroxy radical. Reaction of these substances with a nitrosating agent, for example sodium nitrite, in acid solution results in the corresponding 1-nitroso compounds. This process is specifically illustrated by the reaction of 4-ethoxycarbonyl-4-phenylpiperidine in hydrochloric acid with sodium nitrite to produce 4-ethoxycarbonyl-1-nitroso-4-phenylpiperidine. Reduction of these 1-nitroso compounds, suitably with a suspension of zinc dust in aqueous acetic acid, affords the related 1-amino derivatives. An example of this process is the reaction of 4-ethoxycarbonyl-1-nitroso - 4 - phenylpiperidine with zinc dust in 90% aqueous acetic acid to afford 1-amino-4-ethoxycarbonyl-4-phenylpiperidine. Reductive alkylation of these 1-amino compounds, i.e., reaction with an aldehyde or ketone and hydrogen in the presence of a suitable hydrogenation catalyst, affords the corresponding 1-(substituted-amino) derivatives of this invention. Examples of suitable catalysts are platinum oxide, palladium, and Raney nickel. This catalytic process is exemplified by the reaction of the aforementioned 1-amino-4-ethoxycarbonyl-4-phenylpiperidine with phenylacetone in ethanol solution and hydrogen at room temperature and at a pressure of 100–116 atmospheres in the presence of platinum oxide catalyst to yield 4-ethoxycarbonyl-1-(1-methylphenylethylamino)-4-phenylpiperidine.

The 4-hydroxymethyl compounds of this invention are preferably derived from the aforementioned 4-(lower alkoxy)carbonyl-1-nitroso substances by reaction with a suitable reducing agent. For example, 4-ethoxycarbonyl-1-nitroso-4-phenylpiperidine in ether is treated with lithium aluminum hydride to yield 1-amino-4-hydroxymethyl-4-phenylpiperidine.

Hydrolysis of the instant 4-(lower alkoxy)carbonyl compounds results in the corresponding 4-carboxy substances of this invention. A specific example of this process is the reaction of 1-amino-4-ethoxycarbonyl-4-phenylpiperidine hydrochloride with dilute hydrochloric acid, resulting in 1-amino-4-carboxy-4-phenylpiperidine hydrochloride.

The compounds of this invention display valuable pharmacological properties. They are, for example, anorectic, central nervous system-stimulating, anti-ulcer, hypotensive, anti-inflammatory, and diuretic agents. In addition, they are antibiotic agents in view of their ability to inhibit the growth of Bacillus subtilis, Escherichia coli, Diplococcus pneumoniae, Trichophyton mentagrophytes, and Chlorella vulgaris. It is apparent that the herein-disclosed novel nitroso compounds, 4-p-chlorophenyl-4-hydroxy-1-nitrosopiperidine and 4-ethoxycarbonyl-1-nitroso-4-phenylpiperidine are useful as intermediates in the manufacture of the aforementioned substituted 1-amino compounds of this invention.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

To a solution of 100 parts of 4-ethoxycarbonyl-4-phenylpiperidine hydrochloride in 150 parts of water, at 75–80°, is added dropwise with stirring over a period of about 1½ hours, a solution of 26.2 parts of sodium nitrite in 70 parts of water. Stirring at 75–80° is continued for about 2 hours longer, and the reaction mixture is cooled to room temperature, then extracted with benzene. The organic layer is separated, washed with water, dried over anhydrous potassium carbonate, and stripped of solvent at reduced pressure. Recrystallization of the residue from heptane affords a low-melting solid, which is 4-ethoxycarbonyl-1-nitroso-4-phenylpiperidine.

Example 2

To a suspension of 15.2 parts of 4-ethoxycarbonyl-1-nitroso-4-phenylpiperidine and 15.4 parts of zinc dust in 60 parts of water is added, dropwise with stirring over a period of about 1½ hours, 49.7 parts by volume of 90% aqueous acetic acid, the temperature being maintained below 40° by external cooling. The reaction mixture is stirred at room temperature for about 4 hours longer, then is filtered to remove excess zinc. The resulting filtrate is made alkaline by the addition of excess concentrated aqueous sodium hydroxide, some water being added to solubilize the precipitate which forms. The alkaline mixture is cooled, and the resulting solid product is collected by filtration, then dried and extracted with hot chloroform. The chloroform solution is filtered, then is concentrated to afford a yellow oil, which solidifies on cooling. This solid material is 1-amino- 4-ethoxycarbonyl-4-phenylpiperidine, which melts at about 62–65°. It is further characterized by the formula

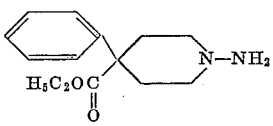

An etheral solution of 1-amino-4-ethoxycarbonyl-4-phenylpiperidine is treated with excess isopropanolic hydrogen chloride, and the resulting precipitate is recrystallized twice from ethanol-absolute ether to yield pure 1-amino-4-ethoxycarbonyl-4-phenylpiperidine hydrochloride, M.P. about 172–175.5°.

*Example 3*

A suspension of 9.7 parts of lithium aluminum hydride in 213 parts of absolute ether is heated at reflux with stirring for about 45 minutes, then is cooled, and a solution of 33.4 parts of 4-ethoxycarbonyl-1-nitroso-4-phenylpiperidine in 106 parts of absolute ether is added dropwise with stirring over a period of 1½ hours. This reaction mixture is stirred at room temperature for about 1½ hours, then is heated at reflux for about 2 hours, and finally is cooled by means of an ice bath. To this cooled solution is added successively, 4.5 parts of ethyl acetate, 10.2 parts of water, 7.65 parts of 20% aqueous sodium hydroxide, and 35.7 parts of water. The precipitated solid is collected by filtration, then is extracted with hot benzene. The benzene solution is filtered, then is cooled to afford a white crystalline solid, which is 1-amino-4-hydroxymethyl-4-phenylpiperidine of the formula

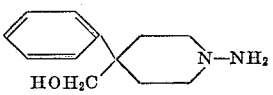

The latter free base is converted, by the procedure disclosed in Example 2, to 1-amino-4-hydroxymethyl-4-phenylpiperidine hydrochloride, isolated as white needles and melting at about 169.5–171.5°.

*Example 4*

To a solution of 5.7 parts of 1-amino-4-hydroxymethyl-4-phenylpiperidine, 4.02 parts of phenylacetone, and 1.67 parts of glacial acetic acid in 40 parts of ethanol is added 0.3 part of platinum oxide catalyst, and this mixture is shaken in a hydrogen atmosphere at 100–116 atmospheres' pressure until the uptake of gas ceases. The catalyst is removed by filtration, and the filtrate is concentrated in vacuo to produce an oily residue. This residue is suspended in water, and the suspension is made alkaline by the addition of dilute aqueous sodium hydroxide to afford the oily crude product, 4-hydroxymethyl-1-(1-methylphenethylamino) - 4-phenylpiperidine of the structural formula

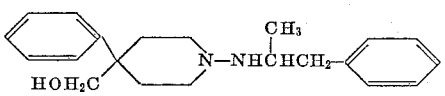

The latter oily free base is extracted with ether, and the ether extract is dried over anhydrous potassium carbonate, then is treated with isopropanolic hydrogen chloride. The resulting precipitate is recrystallized from ethanol-absolute ether to afford 4-hydroxymethyl-1-(1-methylphenethylamino)-4-phenylpiperidine hydrochloride as a white powder, melting at about 130–133°.

*Example 5*

To a solution of 7.2 parts of 1-amino-4-ethoxy-carbonyl-4-phenylpiperidine, 4.69 parts of phenylacetone, and 1.74 parts of glacial acetic acid in 40 parts of ethanol is added 0.5 part of platinum oxide catalyst, and this reaction mixture is shaken in a hydrogen atmosphere at 100–116 atmospheres' pressure until hydrogen is no longer absorbed. The catalyst is removed by filtration, and the filtrate is stripped of solvent at reduced pressure to afford an oily residue, which is suspended in water and made alkaline with dilute sodium hydroxide. The resulting oil is crude 4-ethoxycarbonyl-1-(1-methylphenethylamino)-4-phenylpiperidine, which is represented by the formula

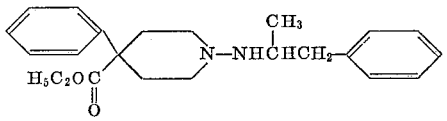

The oily free base is extracted into ether, and the resulting organic solution is dried over anhydrous potassium carbonate, then is treated with isopropanolic hydrogen chloride. Recrystallization of the resulting precipitate from ethanol-absolute ether affords white crystals of 4 - ethoxycarbonyl-1-(1-methylphenethylamino)-4-phenylpiperidine hydrochloride, which melts at about 159–160.5°.

*Example 6*

A mixture of 6.2 parts of 1-amino-4-ethoxy-carbonyl-4-phenylpiperidine, 1.5 parts of acetone, and 1.5 parts of glacial acetic acid is dissolved in 160 parts of ethanol, and 0.6 part of platinum oxide catalyst is added. This reaction mixture is shaken in a hydrogen atmosphere at 100–116 atmospheres' pressure until the uptake of gas ceases. The catalyst is removed by filtration, and the resulting filtrate is concentrated to dryness at reduced pressure. A suspension of the oily residue in water is made alkaline by the addition of dilute aqueous sodium hydroxide, and this alkaline mixture is extracted with ether. The ether extract is dried over anhydrous potassium carbonate, then is treated with isopropanolic hydrogen chloride. Recrystallization of the resulting precipitate from ethanol-absolute ether affords off-white crystals of 4-ethoxycarbonyl-1-isopropylamino-4-phenylpiperidine hydrochloride, M.P. about 167–191°.

*Example 7*

To a solution of 6.19 parts of 1-amino-4-hydroxymethyl-4-phenylpiperidine, 5.18 parts of benzylacetone, and 1.8 parts of glacial acetic acid in 40 parts of ethanol is added 0.6 part of platinum oxide catalyst, and this reaction mixture is shaken with hydrogen at a pressure of 107–126 atmospheres. After the uptake of hydrogen ceases, the catalyst is removed by filtration, and the filtrate is cooled to effect precipitation of a white crystalline solid. This solid is collected by filtration, then suspended in water, and the aqueous suspension is made alkaline by the addition of dilute aqueous sodium hydroxide. Extraction with ether affords an organic solution, which is dried over anhydrous potassium carbonate containing decolorizing carbon, then treated with isopropanolic hydrogen chloride. The resulting precipitate is recrystallized twice from ethanol-absolute ether to produce white crystals of 4-hydroxymethyl-1 - (1 - methyl - 3 - phenylpropylamino)-4-phenylpiperidine hydrochloride, which melts at about 144.5–146.5°.

*Example 8*

A mixture of 6.19 parts of 1-amino-4-hydroxymethyl-4-phenylpiperidine, 3.9 parts of cycloöctanone, 1.8 parts of glacial acetic acid, 40 parts of ethanol, and 0.6 part of platinum oxide catalyst is hydrogenated at 100–116 atmospheres' pressure until the uptake of hydrogen gas ceases. The catalyst is removed by filtration, and the filtrate is concentrated in vacuo to afford an oily residue, which is suspended in water and made alkaline with dilute aqueous sodium hydroxide. The resulting oily product is extracted into ether, and the organic solution is dried over anhydrous potassium carbonate, then treated with isopropanolic hydrogen chloride. The precipitate which forms is collected by filtration, then is recrystallized from ethanol-absolute ether to produce pure 1-cyclooctylamino-4-hydroxymethyl-4-phenylpiperidine hydrochloride, M.P. about 154–156°.

Example 9

A mixture of 9.2 parts of 1-amino-4-ethoxycarbonyl-4-phenylpiperidine hydrochloride and 38.4 parts of 5% hydrochloric acid is heated at the reflux temperature for about 18 hours, and the hot solution is filtered, then cooled in an ice bath. The precipitate which forms is collected by filtration, washed on the filter with cold water, then dried to afford crystals of pure 1-amino-4-carboxy-4-phenylpiperidine hydrochloride, which melts at about 222.5–223.5° with effervescence. This compound is represented by the structural formula

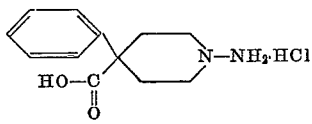

Example 10

To a suspension of 106 parts of 4-p-chlorophenyl-4-hydroxypiperidine in 100 parts of water is added dropwise, with stirring and cooling, a solution of 53.6 parts of concentrated hydrochloric acid in 200 parts of water. The resulting suspension is heated to about 30–40°, then is treated with a solution of 35 parts of sodium nitrite in 50 parts of water. The reaction mixture is stirred for about 15 minutes following completion of the addition of sodium nitrite, and the precipitate which forms is collected by filtration, then is extracted with methylene chloride. The organic extract is washed with water, dried over anhydrous potassium carbonate, treated with decolorizing carbon, and evaporated to dryness under reduced pressure. Recrystallization of the residue from ethyl acetate-heptane results in pure 4-p-chlorophenyl-4-hydroxy-1-nitrosopiperidine, which melts at about 90°.

Example 11

To a suspension of 20 parts of lithium aluminum hydride in 622 parts of tetrahydrofuran is added, at room temperature over a period of about one hour, a solution of 76 parts of 4-p-chlorophenyl-4-hydroxy-1-nitrosopiperidine in 222 parts of tetrahydrofuran. The reaction mixture is stirred at room temperature for about one hour, then is heated at reflux for about 2 hours, and finally is stored at room temperature for about 16 hours. To this mixture is then added successively 21 parts of water, 19.5 parts of 20% aqueous sodium hydroxide, and 75 parts of water. The resulting inorganic salts are collected by filtration and washed on the filter with tetrahydrofuran. The filtrate is concentrated to about 150–200 parts by volume, then is diluted with ether. The resulting crude product which precipitates is collected by filtration and recrystallized from ethyl acetate to yield 1-amino-4-p-chlorophenyl-4-hydroxypiperidine, M.P. about 165–167°. It is represented by the structural formula

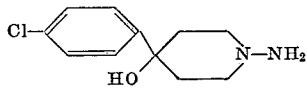

Example 12

A mixture of 11.3 parts of 1-amino-4-p-chlorophenyl-4-hydroxypiperidine, 7.3 parts of phenylacetone, 1.5 parts of glacial acetic acid, 100 parts of ethanol, and 0.5 part of platinum oxide catalyst is shaken with hydrogen at an initial pressure of 100 atmospheres until the uptake of hydrogen ceases. The catalyst is removed by filtration, and the resulting filtrate is concentrated to dryness at reduced pressure. Extraction of this residue with ether affords an organic solution, which is extracted with dilute hydrochloric acid. The hydrochloride salt which separates from the acidic solution upon standing is collected by filtration, then is suspended in water and treated with dilute aqueous sodium carbonate solution. The resulting free base is extracted into ether, and the ether extract is dried over anhydrous potassium carbonate, treated with decolorizing carbon, and concentrated in vacuo to afford an oil consisting of 4-p-chlorophenyl-4-hydroxy-1-(1-methylphenethylamino)piperidine.

The latter free base is dissolved in isopropyl alcohol and is treated with a solution of maleic acid in isopropyl alcohol to afford a precipitate, which is collected by filtration and recrystallized from isopropyl alcohol to yield 4-p-chlorophenyl - 4 - hydroxy - 1 - (1 - methylphenethylamino)-piperidine maleate, which melts at about 159–161°.

Example 13

The substitution of 94.8 parts of 4-methoxy-carbonyl-4-phenylpiperidine hydrochloride in the process of Example 1 results in 4-methoxycarbonyl-1-nitroso-4-phenylpiperidine.

Example 14

The substitution of 14.4 parts of 4-methoxy-carbonyl-1-nitroso-4-phenylpiperidine in the procedure of Example 2 results in 1-amino-4-methoxycarbonyl-4-phenylpiperidine.

Example 15

The substitution of 6.73 parts of 1-amino-4-methoxycarbonyl-4-phenylpiperidine in the procedure of Example 5 results in 4-methoxycarbonyl-1-(1-methylphenethylamino)-4-phenylpiperidine.

Example 16

By substituting 2.6 parts of cyclopentanone and otherwise proceeding according to the processes of Example 8, 1-cyclopentyl-4-hydroxymethyl-4-phenylpiperidine is obtained.

Example 17

The substitution of 1.86 parts of butanone in the procedure of Example 6 results in 4-ethoxycarbonyl-1-(1-methylpropylamino)-4-phenylpiperidine, which is represented by the formula

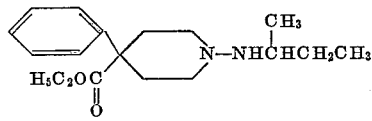

What is claimed is:
1. A compound of the formula

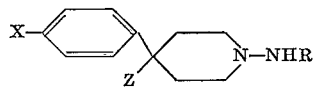

wherein X is selected from the group consisting of hydrogen and chlorine, Z is selected from the group of radicals consisting of hydroxy, hydroxymethyl, carboxy, and (lower alkoxy)carbonyl, and R is a radical selected from the group consisting of phenyl(lower alkylene) and

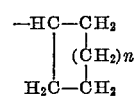

wherein $n$ is a positive integer less than 5.
2. 1-amino-4-hydroxymethyl-4-phenylpiperidine.
3. 1-amino-4-p-chlorophenyl-4-hydroxypiperidine.
4. 4-p-chlorophenyl - 4 - hydroxy-1-(1-methylphenethylamino)piperidine.
5. 1-amino-4-carboxy-4-phenylpiperidine.
6. A compound of the formula

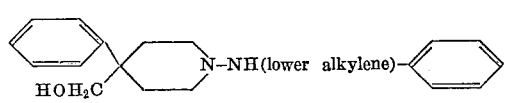

7. 4-hydroxymethyl - 1 - (1-methylphenethylamino)-4-phenylpiperidine.

8. 4-hydroxymethyl - 1 - (1-methyl - 3 - phenylpropylamino)-4-phenylpiperidine.

9. A compound of the formula

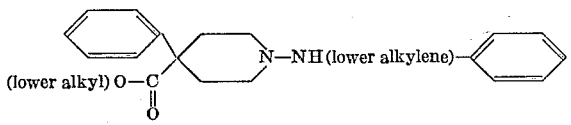

10. 4-ethoxycarbonyl - 1 - (1-methylphenethylamino)-4-phenylpiperidine.

11. A compound of the formula

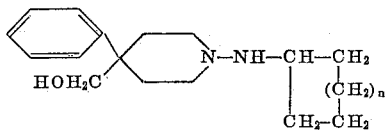

wherein $n$ is a positive integer less than 5.

12. 1-cyclooctylamino - 4 - hydroxymethyl - 4 - phenylpiperidine.

13. 4 - ethoxycarbonyl-1-isopropylamino - 4 - phenylpiperidine.

14. 4-p-chlorophenyl-4-hydroxy-1-nitrosopiperidine.

References Cited by the Examiner
UNITED STATES PATENTS 3,051,707  8/62  Biel _____ 260—569

OTHER REFERENCES

Schaumann, "Arch. Exptl. Path. Pharmakol," vol. 196, pages 109–36 (1940), reported in "Chemical Abstracts," Decennial Index, vols. 31–40, 1937–1946; Subject Index, page 6750.

NICHOLAS S. RIZZO, *Primary Examiner.*

DUVAL T. McCUTCHEN, IRVING MARCUS, WALTER A. MODANCE, *Examiners.*